(12) United States Patent
Wojtaszyk (10) Patent No.: US 11,498,640 B1
(45) Date of Patent: Nov. 15, 2022

(54) BRAKE PEDAL LEVER TIP PEG FOR MOTORCYCLE

(71) Applicant: Bartosh Wojtaszyk, Fountain Hills, AZ (US)

(72) Inventor: Bartosh Wojtaszyk, Fountain Hills, AZ (US)

(73) Assignee: FLO MOTORSPORTS, Fountain Hills, AZ (US)

( * ) Notice: Subject to any disclaimer, the term of this patent is extended or adjusted under 35 U.S.C. 154(b) by 0 days.

(21) Appl. No.: 17/583,212

(22) Filed: Jan. 25, 2022

(51) Int. Cl.
| | |
|---|---|
| *B62L 3/04* | (2006.01) |
| *B62K 23/08* | (2006.01) |
| *B60T 7/04* | (2006.01) |
| *G05G 1/30* | (2008.04) |
| *B60T 7/06* | (2006.01) |
| *G05G 1/32* | (2008.04) |
| *G05G 1/483* | (2008.04) |

(52) U.S. Cl.
CPC ............... *B62L 3/04* (2013.01); *B60T 7/065* (2013.01); *B62K 23/08* (2013.01); *G05G 1/32* (2013.01); *G05G 1/483* (2013.01)

(58) Field of Classification Search
CPC .. B60T 7/04; B60T 7/065; G05G 1/32; G05G 1/44; G05G 1/483; B62K 23/08; B62L 3/04; B60R 21/09; B62J 25/04; B62J 25/06
See application file for complete search history.

(56) References Cited

U.S. PATENT DOCUMENTS

| | | | | |
|---|---|---|---|---|
| D498,442 S | * | 11/2004 | James | D12/114 |
| 8,256,788 B2 | * | 9/2012 | Matsushima | B62J 25/04 280/291 |
| 9,242,697 B2 | * | 1/2016 | Crain | B62J 25/04 |
| 9,540,066 B1 | * | 1/2017 | Bloomer | B62J 25/04 |
| 2005/0241435 A1 | * | 11/2005 | Colano | B62K 23/08 74/560 |
| 2008/0179859 A1 | * | 7/2008 | Boehmke | B62J 25/04 36/131 |
| 2009/0108560 A1 | * | 4/2009 | Mountz | B62J 25/04 280/291 |
| 2018/0346055 A1 | * | 12/2018 | Jaselskis | B62J 25/06 |

FOREIGN PATENT DOCUMENTS

| | | | | |
|---|---|---|---|---|
| DE | 10301184 A1 | * | 8/2004 | B62L 3/04 |
| FR | 1062222 A | * | 4/1954 | |

\* cited by examiner

*Primary Examiner* — Adam D Rogers (57) ABSTRACT

A motorcycle brake pedal lever includes a rod connected to a motorcycle and a base is connected to the rod. The base includes a bore. A pivotal member includes a first pivot and a second pivot extending toward different directions. The first pivot is pivotably connected to the bore of the base so that the pivotal member is pivotable about the first pivot. A peg includes a space formed therein, and the second pivot of the pivotal member is pivotably engaged with the space by a pin so that the peg is pivotable about pin and the second pivot. Multiple torsion springs are respectively mounted to the first and second. The torsion springs respectively contact the pivotal member, the base and the peg. The peg is returned relative to the pivotal member, and the pivotal member is returned relative to the base by the torsion springs.

7 Claims, 15 Drawing Sheets

BRAKE PEDAL LEVER TIP PEG FOR MOTORCYCLE

BACKGROUND OF THE INVENTION

1. Fields of the Invention

The present invention relates to a brake pedal lever tip peg, and more particularly, to a motorcycle brake pedal lever tip peg that is pivotable along the direction that the force applies to the peg so as to protect the pedestrians from being hurt.

2. Descriptions of Related Art

The conventional brake pedal lever for motorcycles generally are located on one side of the motorcycle so that the user can operate the brake pedal lever to brake the motorcycle. In order to allow the rider to conveniently operate the brake pedal lever, the brake pedal lever includes a tip peg formed to the distal end of the brake pedal lever, and the brake pedal lever together with the tip peg protrude beyond the lateral side of the motorcycle. However, the protruded brake pedal lever tip peg may be hit by pedestrians who may be hurt. In addition, when the motorcycle falls, the tip peg is the first portion to hit the ground and may be broken.

The present invention intends to provide a motorcycle brake pedal lever tip peg to eliminate the shortcomings mentioned above.

SUMMARY OF THE INVENTION

The present invention relates to a motorcycle brake pedal lever and comprises a rod connected to a motorcycle. A base has a first side thereof connected to the rod, and a second side of the base has a bore. A pivotal member includes a first pivot and a second pivot. The first pivot is pivotably connected to the bore. A locking member extends through base from the underside of the base and is connected to the first pivot such that the pivotal member is pivotable about the first pivot. A peg has a space formed therein, and the second pivot of the pivotal member is pivotably engaged with the space. A pin extends through the peg, the space and the second pivot to pivotably connect the peg to the pivotal member, so that the peg is pivotable about pin and the second pivot. Multiple torsion springs are respectively mounted to the first and second pivots. One of two ends of each of the torsion springs contacts the pivotal member, and another one of the two ends of each of the torsion springs contacts the base and the peg. The peg is returned relative to the pivotal member, and the pivotal member is returned relative to the base by respective recovery forces of the torsion springs.

The advantages of the present invention are that the pivotal member is located between the base and the peg, so that the peg can be pivoted left and right in horizontal direction, and the peg is also pivotable up and down relative to the base in vertical direction. When the motorcycle falls, the peg is pivoted along the direction that the force applies to the peg, such that the peg is protected from being broken, and thanks to the pivotal action of the peg, the person who hits the peg can also be protected.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 15, the motorcycle brake pedal lever of the present invention comprises a rod 20 is connected to a motorcycle 10, and comprises a base 1 which has the first side thereof connected to the rod 20, and the second side of the base 1 includes a bore 11 defined therethrough. The rod 20 includes multiple positioning holes so that the base 1 is connected to desired position according to the positions of the positioning holes. A pivotal member 2 includes a first pivot 21 and a second pivot 210, the first and second pivots 21, 210 extend toward different directions. The first pivot 21 is pivotably connected to the bore 11. A locking member 3 extends through base 1 from the underside of the base 1 and is connected to the first pivot 21, so that the pivotal member 2 is pivotable about the first pivot 21 left and right in horizontal direction. A peg 4 includes a space 41 formed therein. The second pivot 210 of the pivotal member 2 is pivotably engaged with the space 41. A pin 42 extends through the peg 4, the space 41 and the second pivot 210 to pivotably connect the peg 4 to the pivotal member 2, so that the peg 4 is pivotable about pin 42 and the second pivot 210 up and down in vertical direction. Multiple torsion springs 5 are respectively mounted to the first and second pivots 21, 210. One of two ends of each of the torsion springs 5 contacts the pivotal member 2. Another one of the two ends of each of the torsion springs 5 contacts the base 1 and the peg 4. The peg 4 is returned relative to the pivotal member 2, and the pivotal member 2 is returned relative to the base 1 by respective recovery forces of the torsion springs 5.

Figure 8:
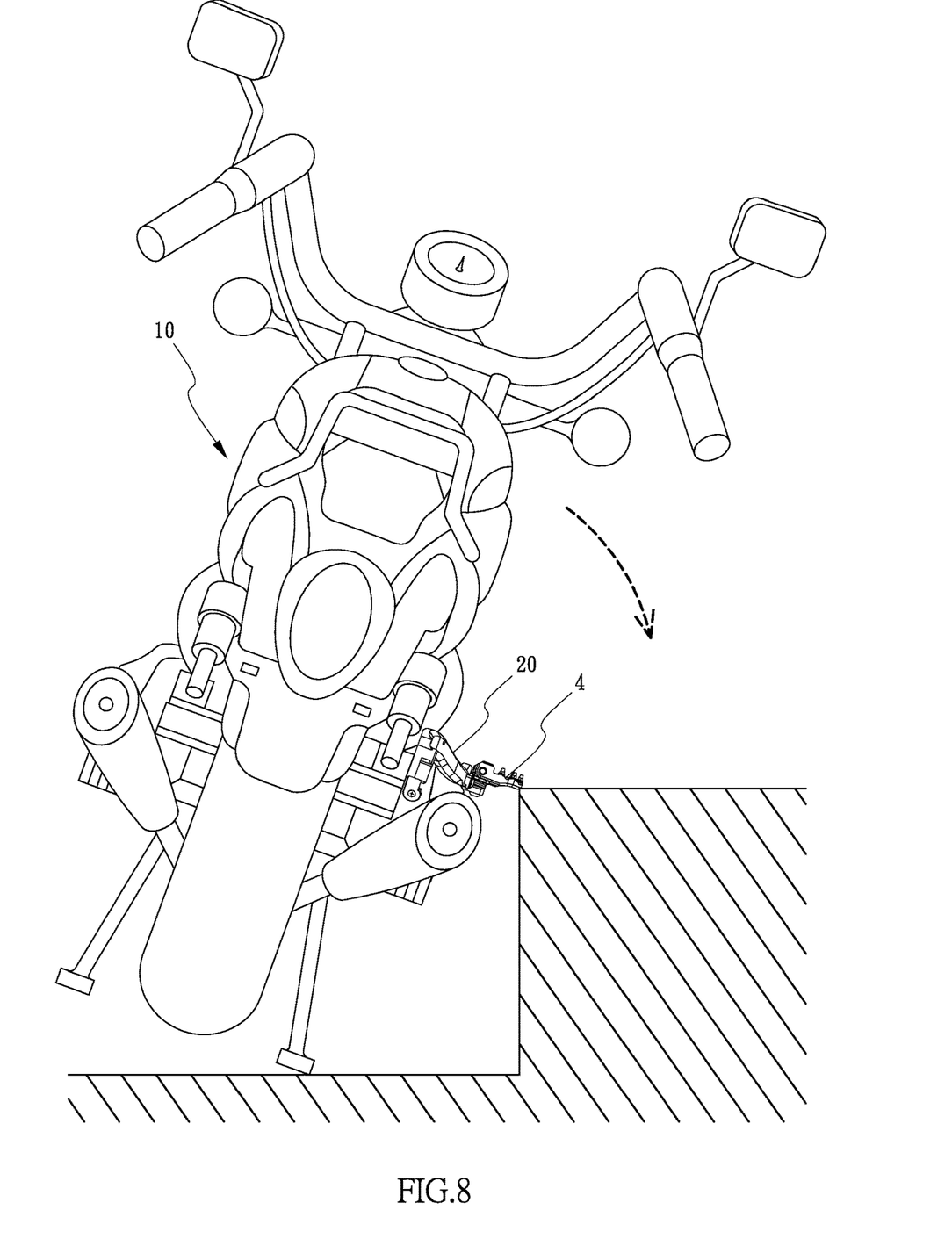
FIG. 8 illustrates that the peg hit an object when the motorcycle falls.
Figure 9:
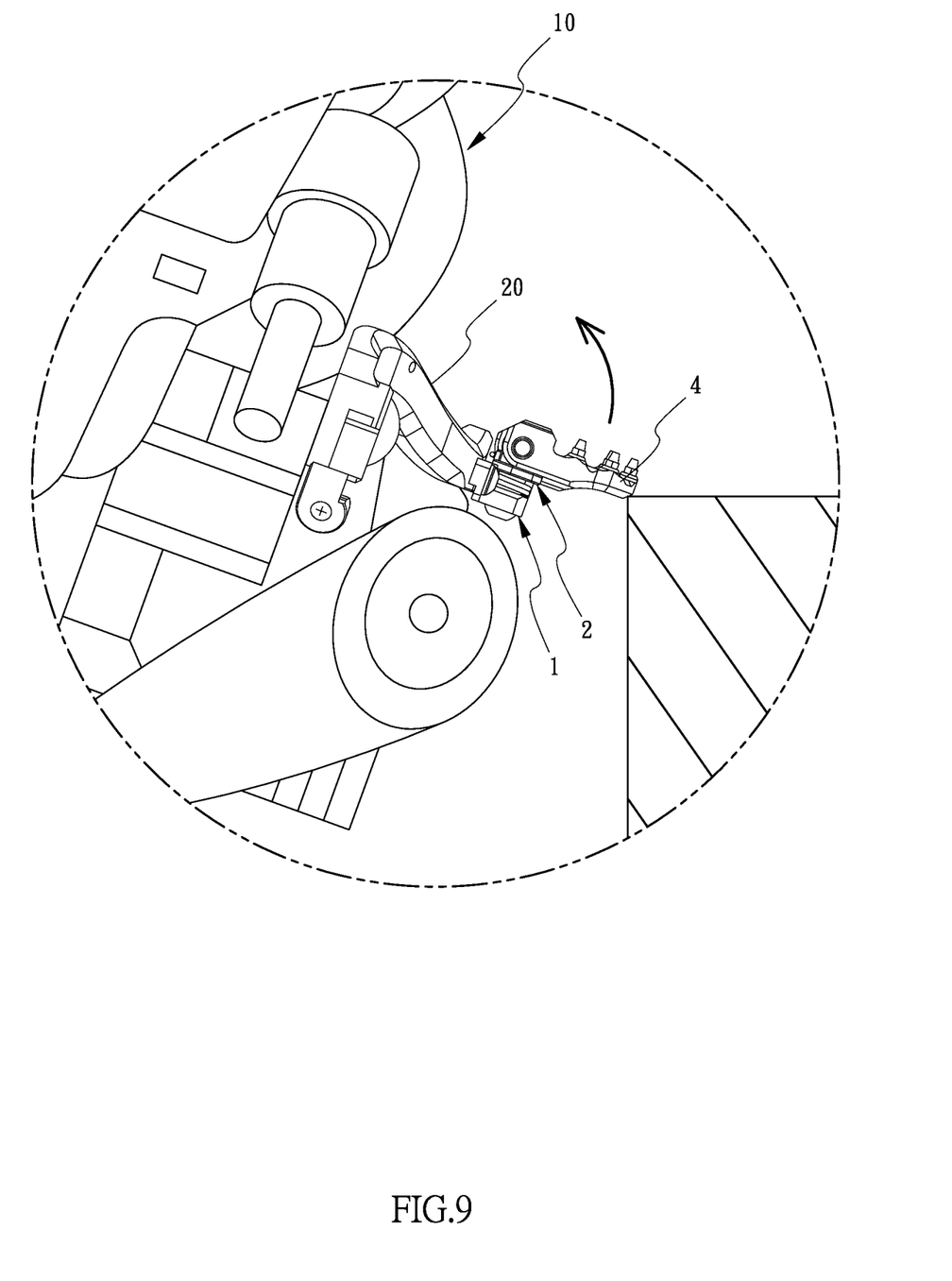
FIG. 9 is an enlarged view to show the peg of the motorcycle brake pedal lever hitting the object in FIG. 8.
Figure 10:
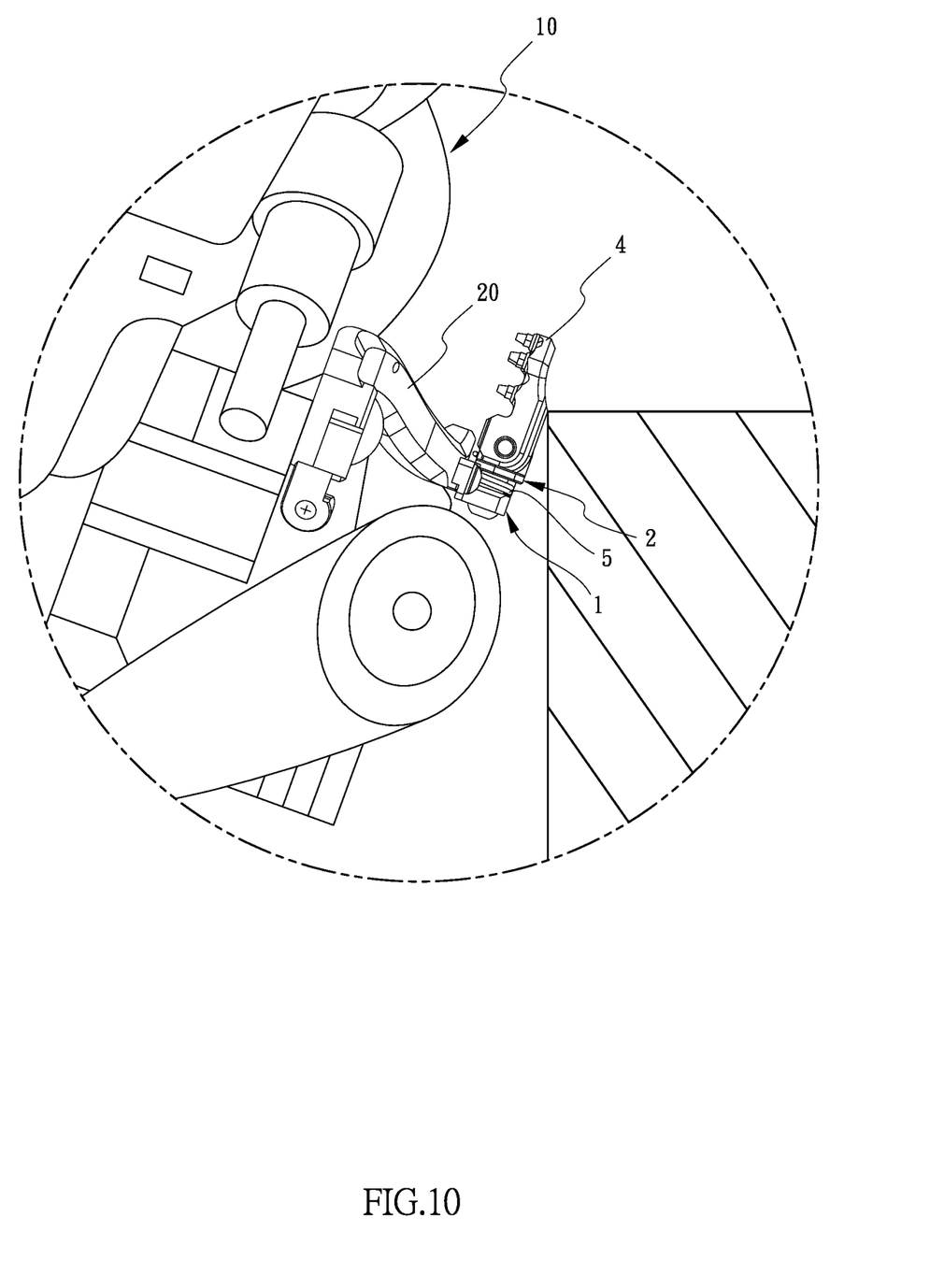
FIG. 10 shows that the peg is pivoted upward when the peg in FIG. 9 hits the object.
Figure 11:
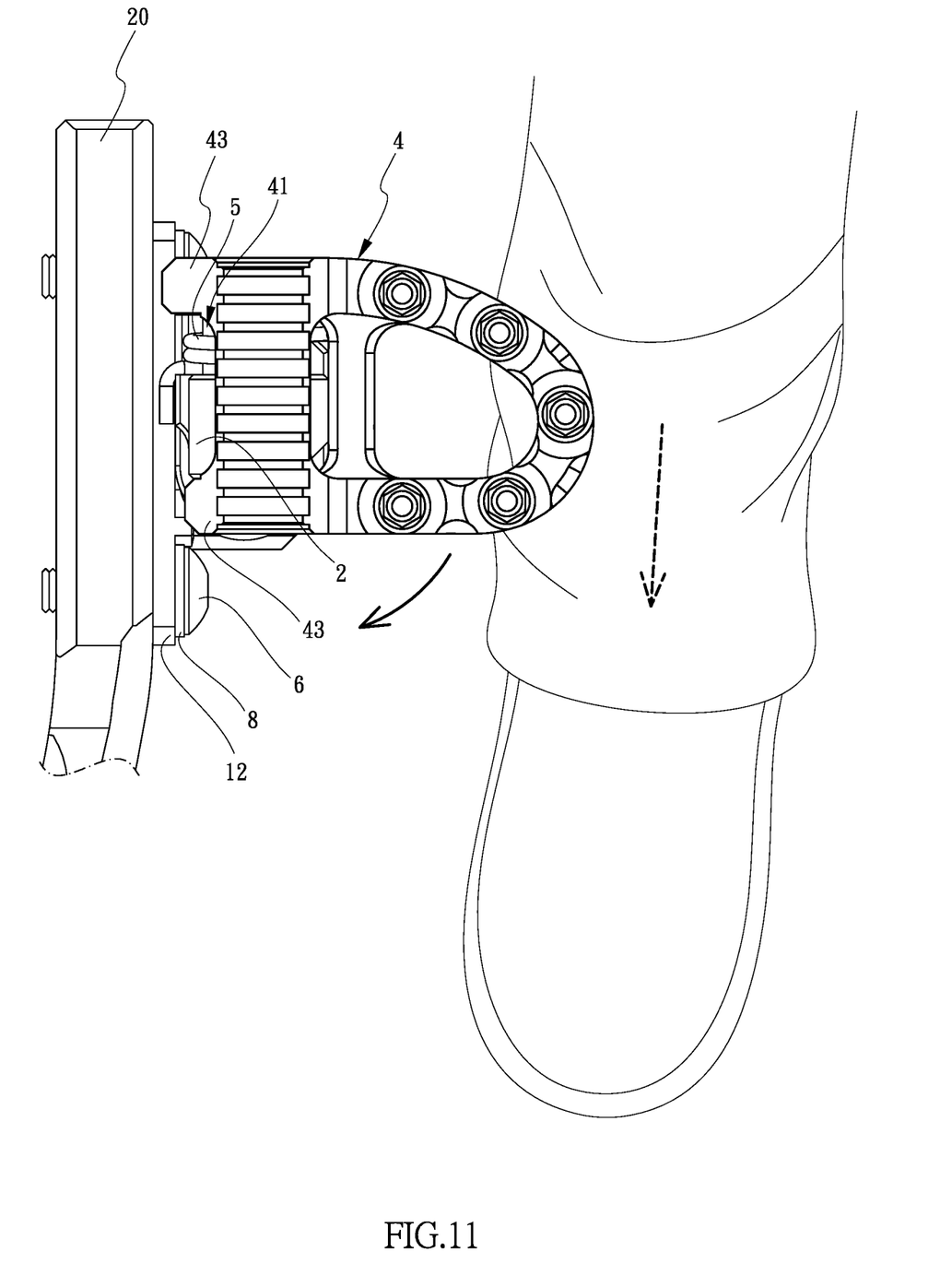
FIG. 11 illustrates that a person hits the peg of the motorcycle brake pedal lever of the present invention.
Figure 12:
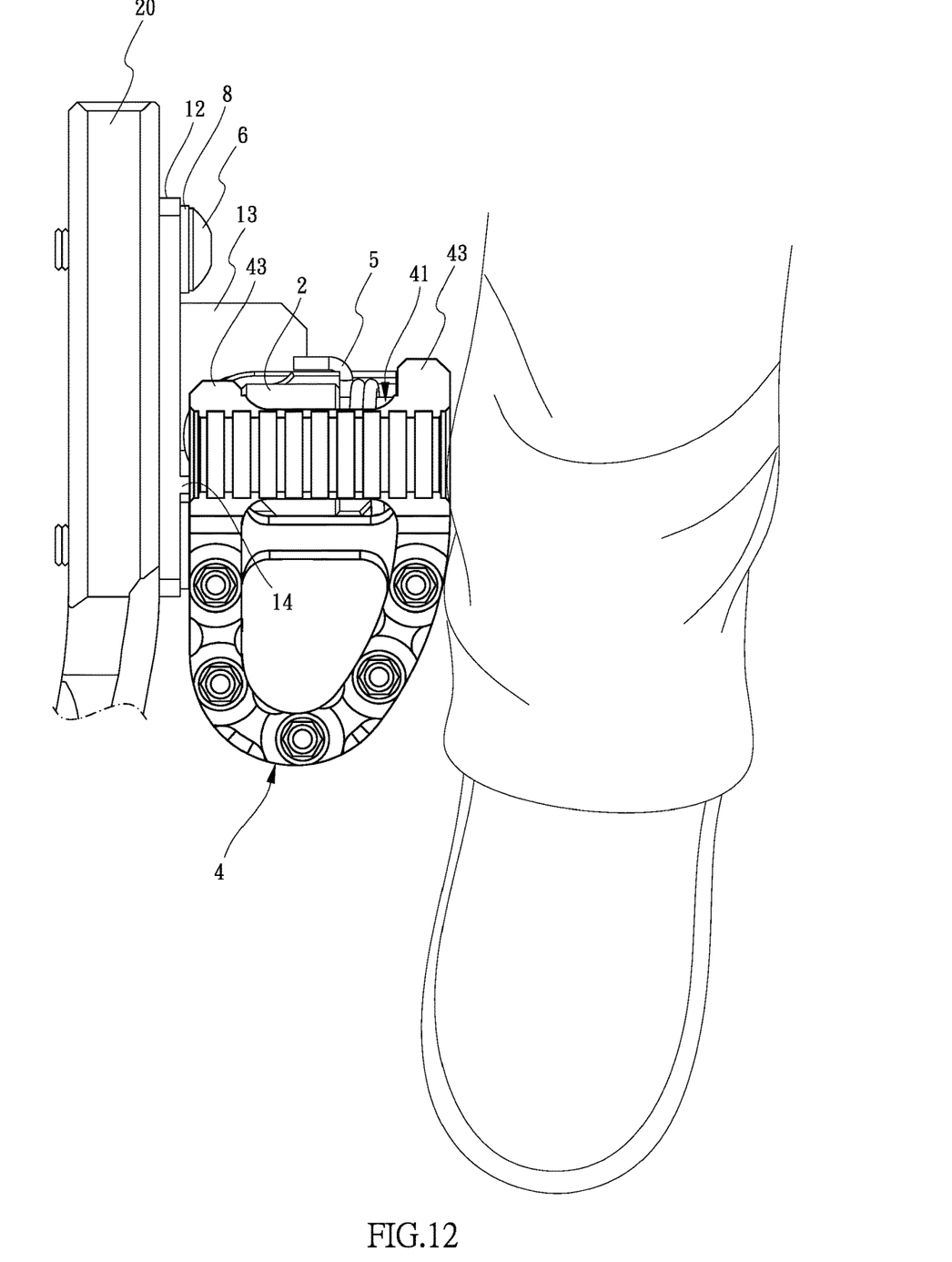
FIG. 12 shows that the peg is pivoted when the peg is hit by the person in FIG. 11.
Figure 13:
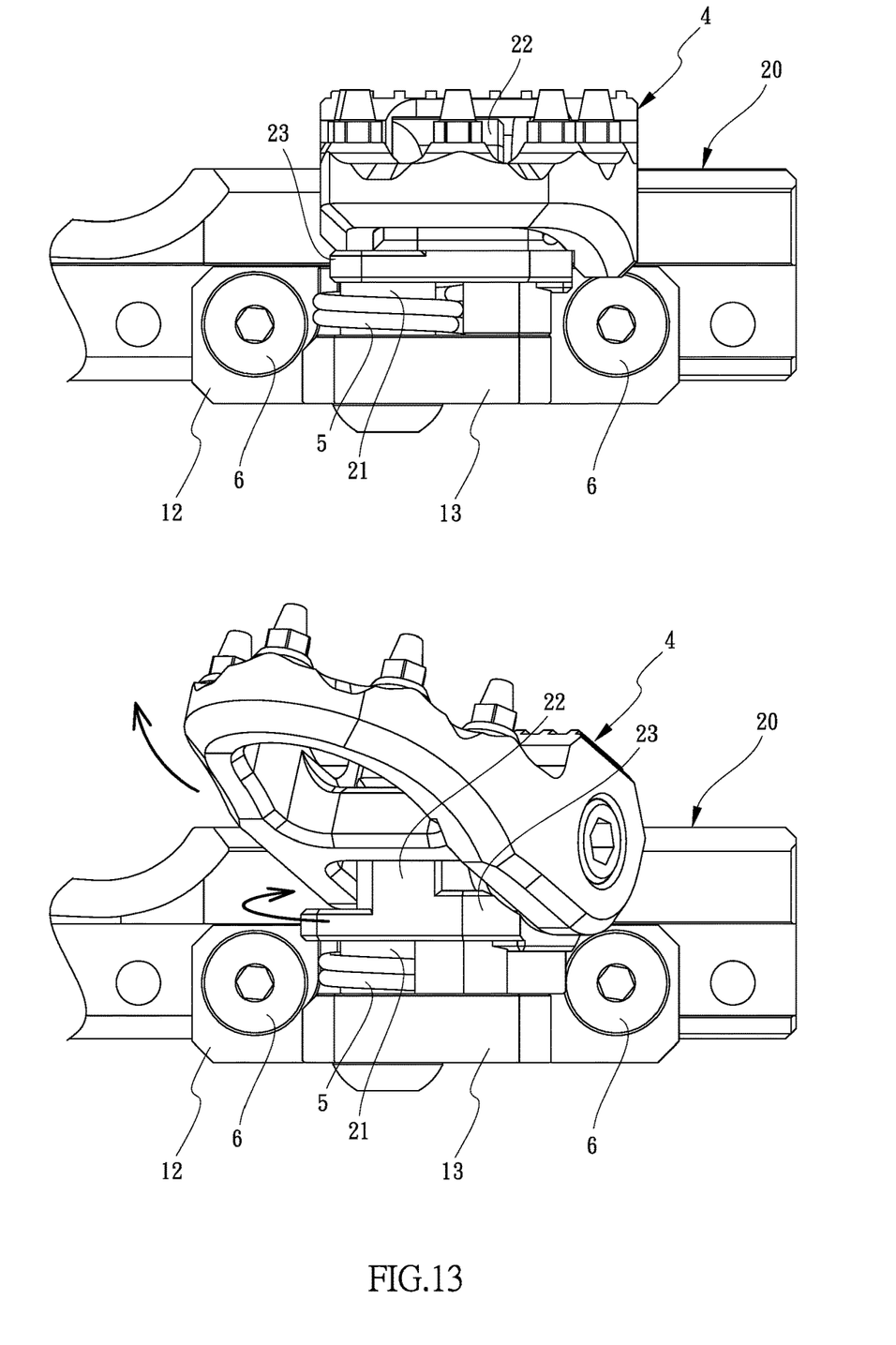
FIG. 13 shows that the peg and the base pivot and swing, and the peg pivots upward and inclinedly.
Figure 14:
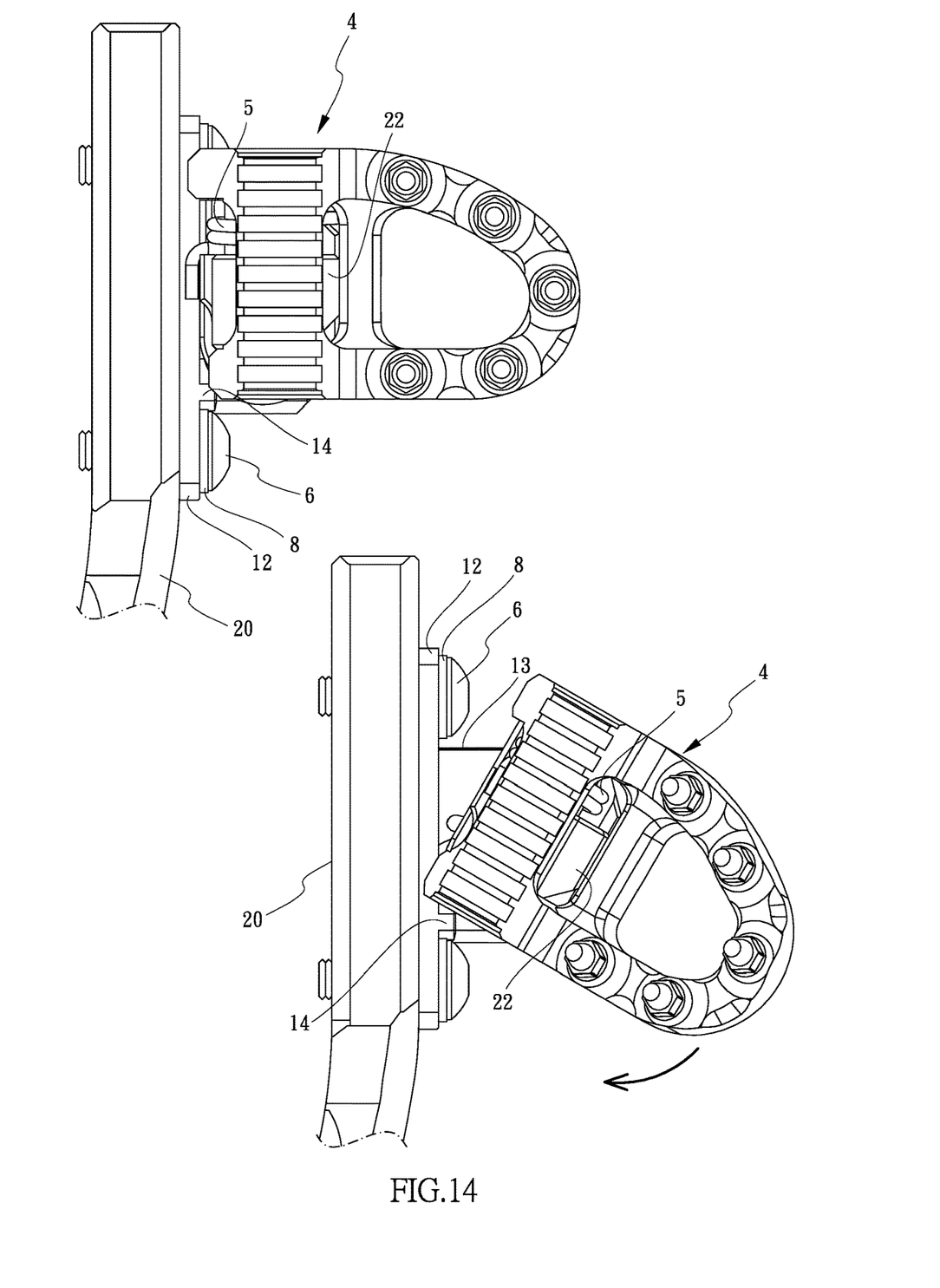
FIG. 14 is another angle of view of the movement of the peg in FIG. 13.
Figure 15:
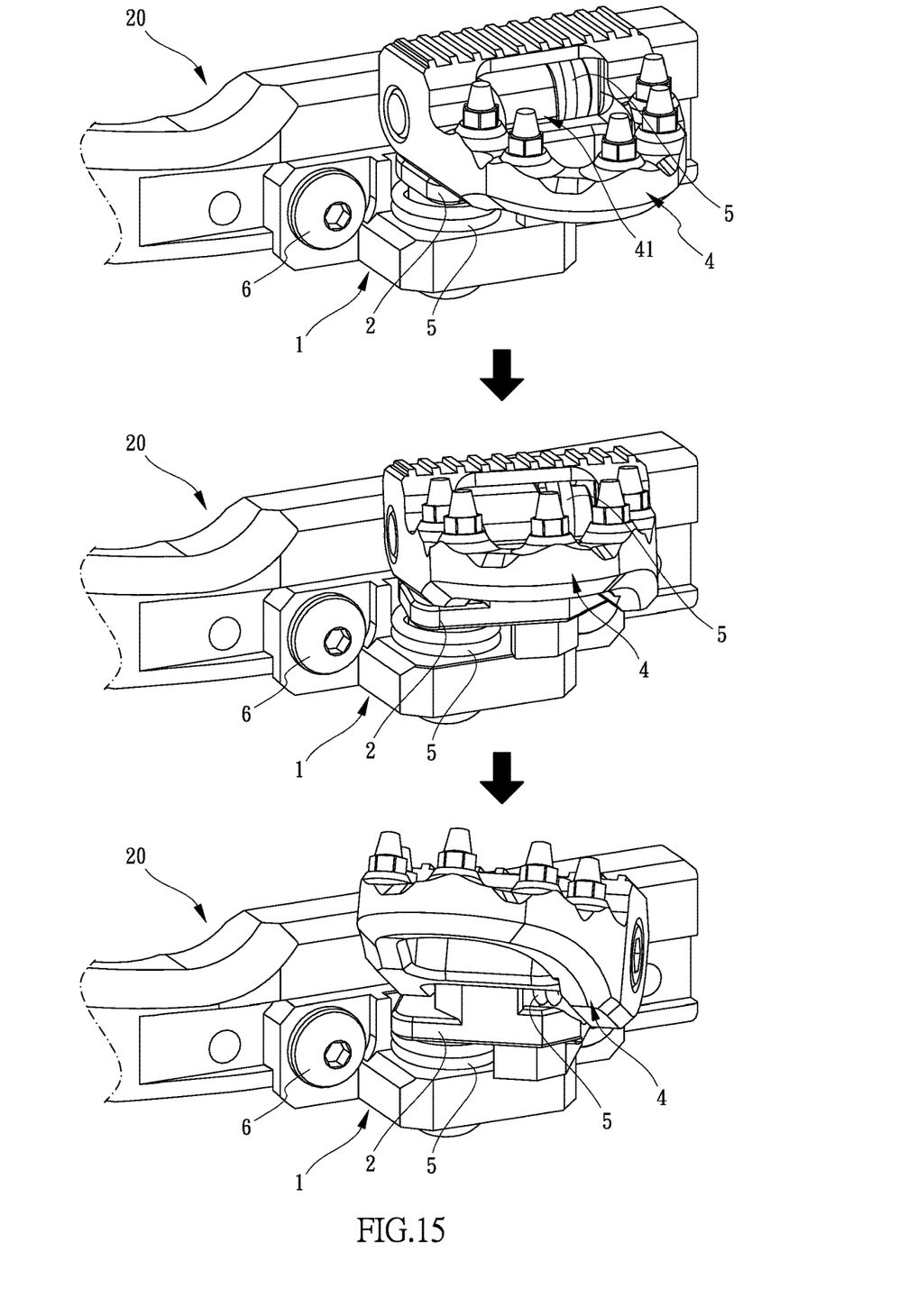
FIG. 15 show consecutive actions to show the movement of the peg in FIG. 13.

When the motorcycle 10 falls, the front end of the peg 4 will hit an object first, and the peg 4 is pivoted upward in the direction of falling as shown in FIGS. 8 to 10 wherein the dotted line in FIG. 8 represents the falling direction, and the solid line in FIG. 9 represents the pivoted direction of the peg 4. Therefore, the peg 4 is protected from being broken. When a pedestrian passes the motorcycle 10 and hits the peg 4, as shown in FIGS. 11 and 12, the peg 4 is pivoted in horizontal direction. The dotted line represents the movement direction of the pedestrian, and the solid line represents the pivoted direction of the peg 4 in FIG. 11. Because the peg 4 is pivoted so that the pedestrian is protected from being hitting hard to the peg 4. The pivotal movement of the peg 4 may also happen when the motorcycle 10 falls onto an uneven floor. It is noted that the peg 4 can be pivoted in multiple different directions by cooperation of the pivotal member 2 and the base 1. As shown in FIGS. 13 to 15, the peg 4 may be pivoted up and down relative to the pivotal member 2, and the pivotal member 2 may be pivoted left and right relative to the base 1 so that the peg 4 is pivoted inclinedly and upward. Assume that the peg 4 is hit at the front end instead of at the lateral side of the peg 4, then the pivotal member 2 is pivoted slightly relative to the base 1, and the peg 4 is pivoted upward relative to the pivotal member 2, then the peg 4 is pivoted along the direction that the force applies to the peg 4 so as to protect the pedestrian's leg.

Figure 1:
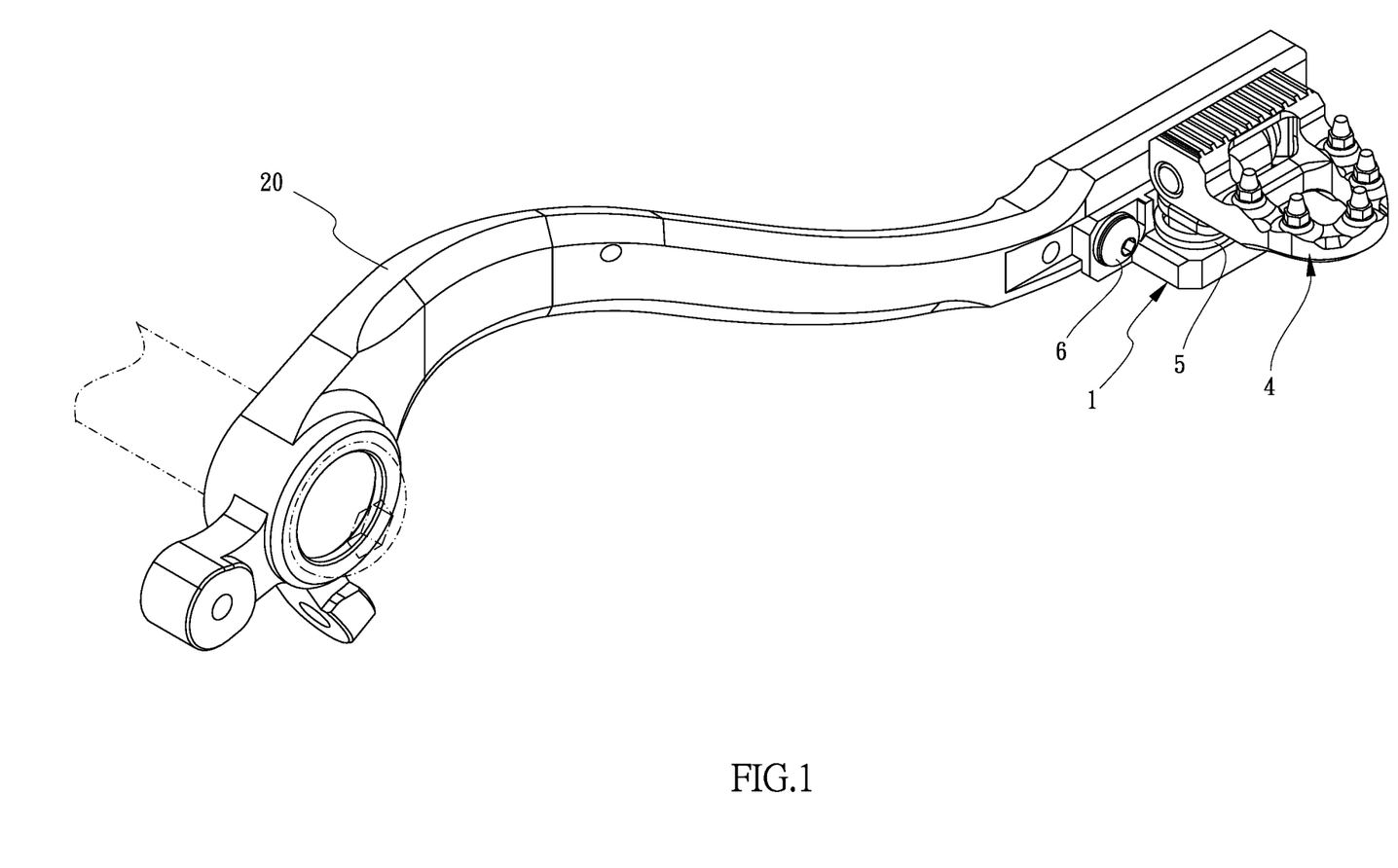
FIG. 1 is a perspective view to show the motorcycle brake pedal lever of the present invention.
Figure 2:
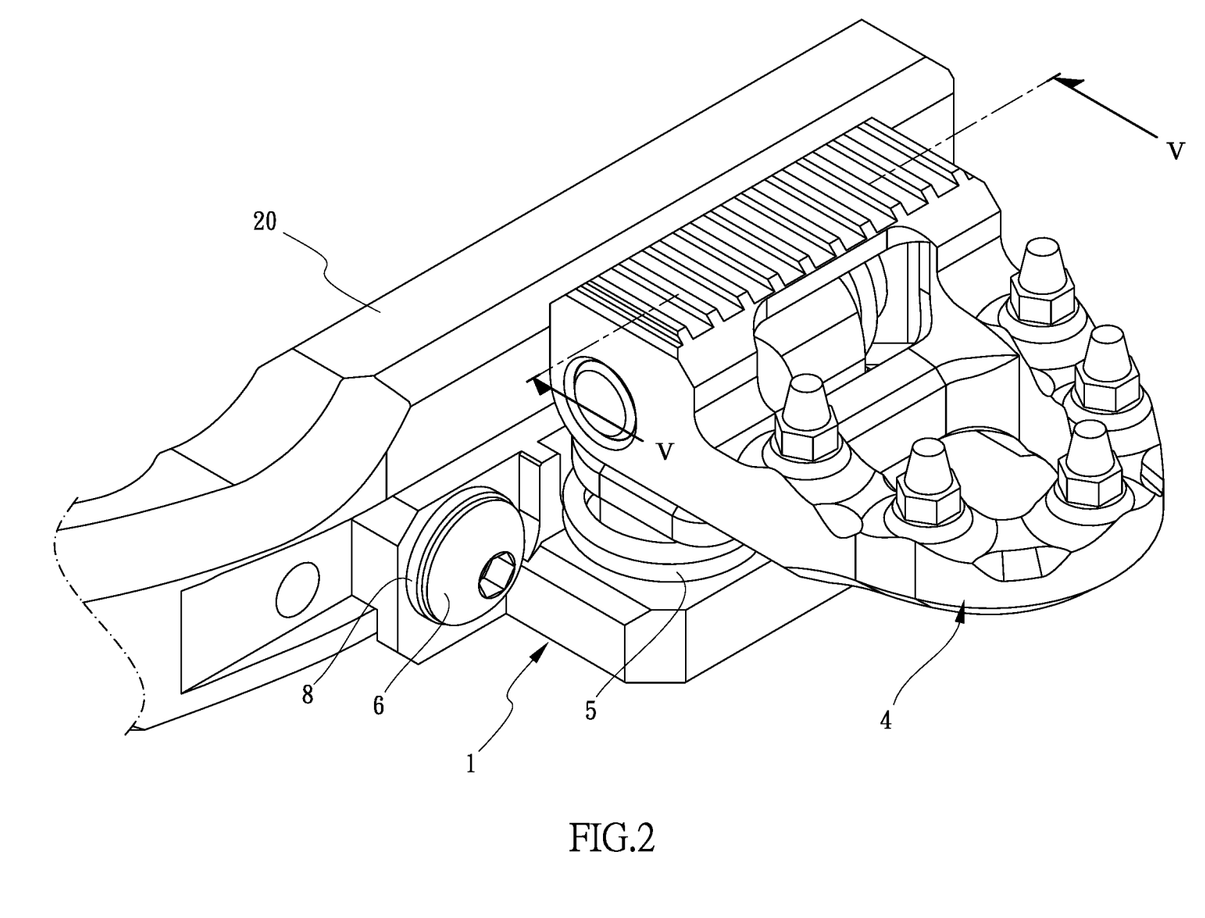
FIG. 2 is an enlarged view to show the peg on the motorcycle brake pedal lever of the present invention.
Figure 3:
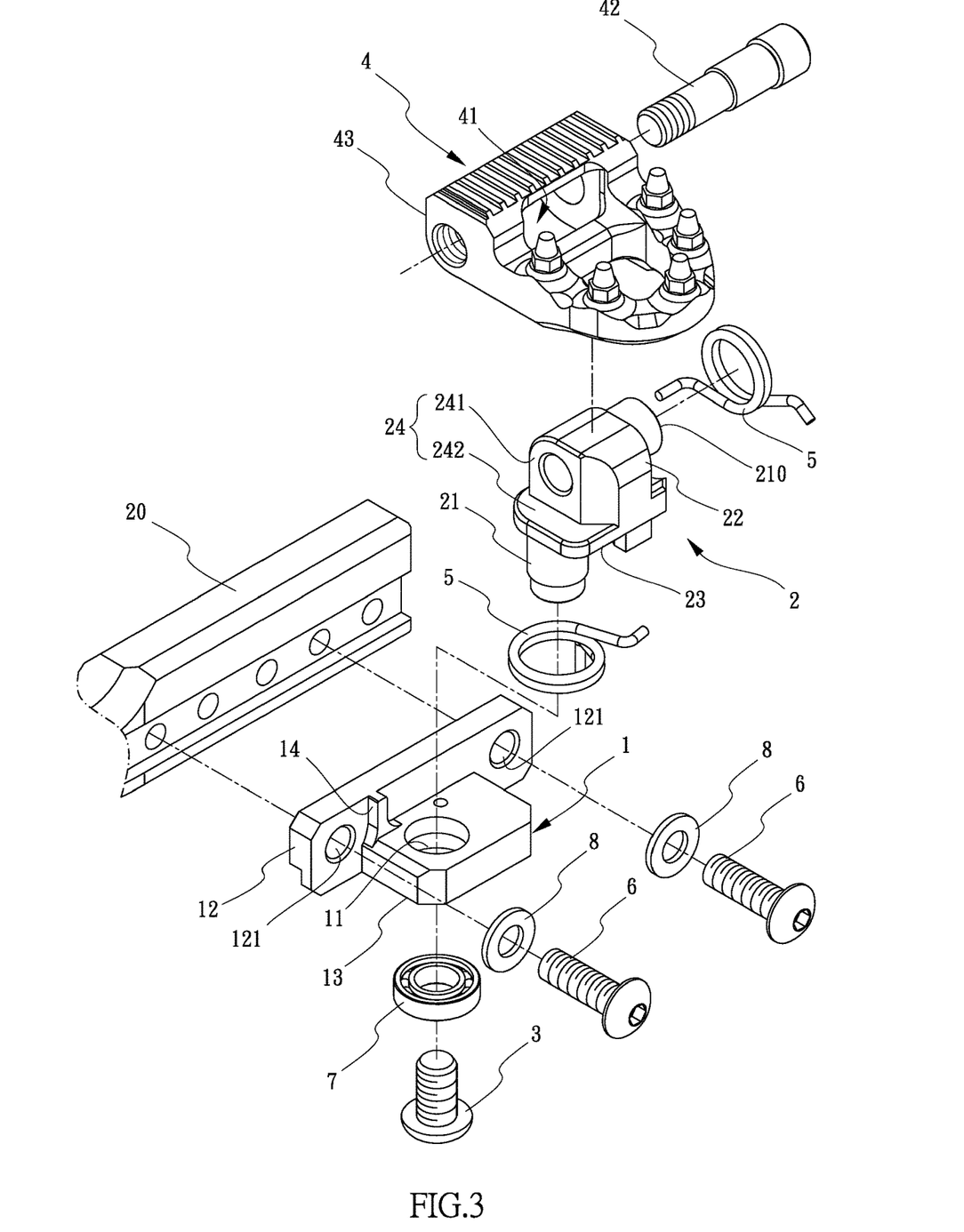
FIG. 3 is an exploded view to show the motorcycle brake pedal lever of the present invention.

As shown in FIG. 3, the base 1 includes a first board 12 and a second board 13 which is perpendicularly formed to the first board 12. The first board 12 is an elongate and rectangular board, and the second board 13 is a polygonal board. Two locking holes 121 are respectively defined through the first board 12, and the second board 13 is located between the two locking holes 121. The bore 11 is defined through the second board 13. Two bolts 6 extend through the two locking holes 121 and are connected to the rod 20.

Figure 7:
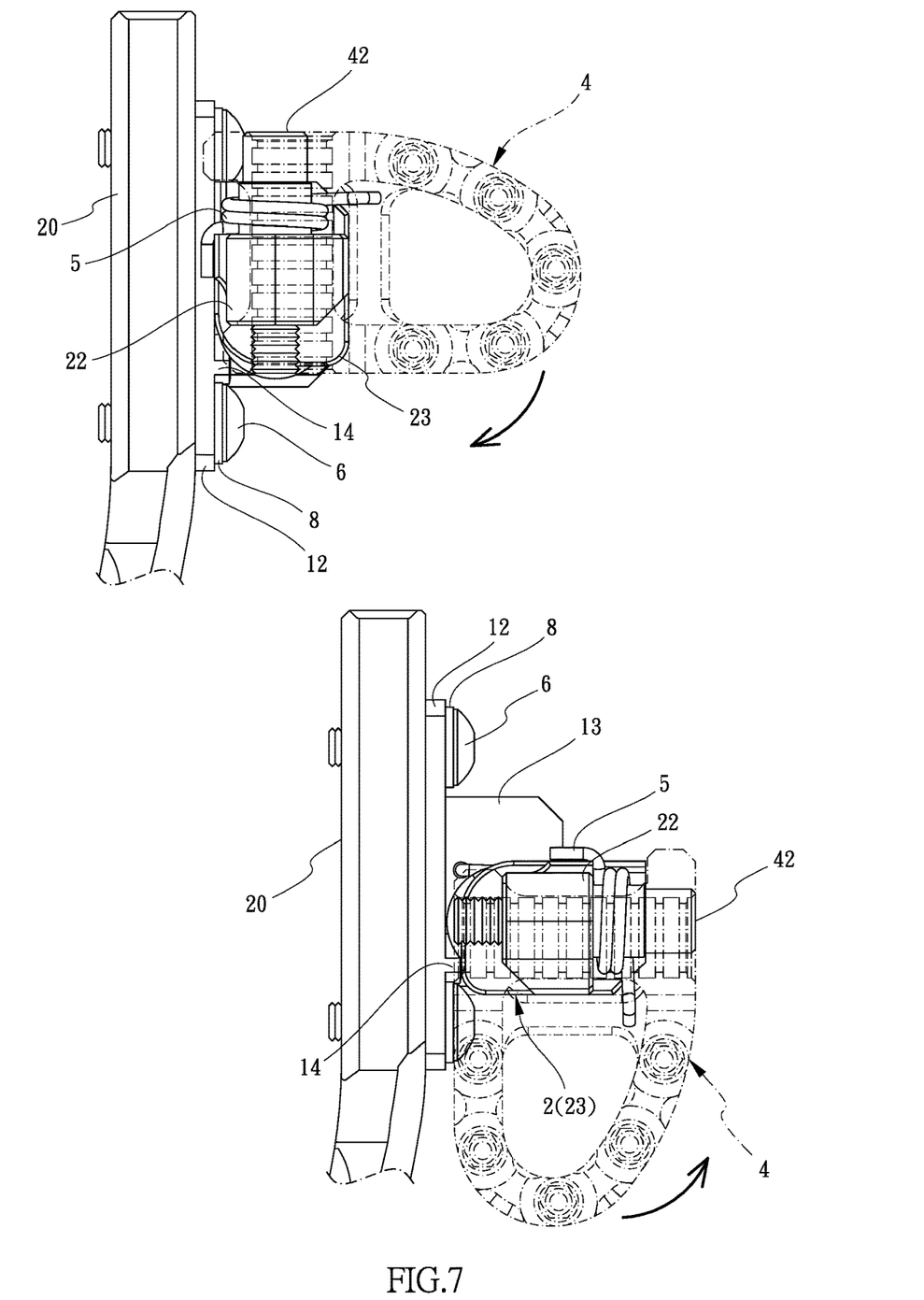
FIG. 7 illustrates that the peg is pivoted left and right relative to the base.

As shown in FIGS. 3 and 7, in order to prevent the peg 4 from being hit by components nearby to damage the peg 4, a stop 14 is formed between the first board 12 and the second board 13. When the peg 4 is pushed and pivoted toward the rod 20, the stop 14 contacts the pivotal member 2 to restrict the peg 4 from touching the pivotal member 2 by keeping a distance between the rod 20 and the peg 4.

Figure 4:
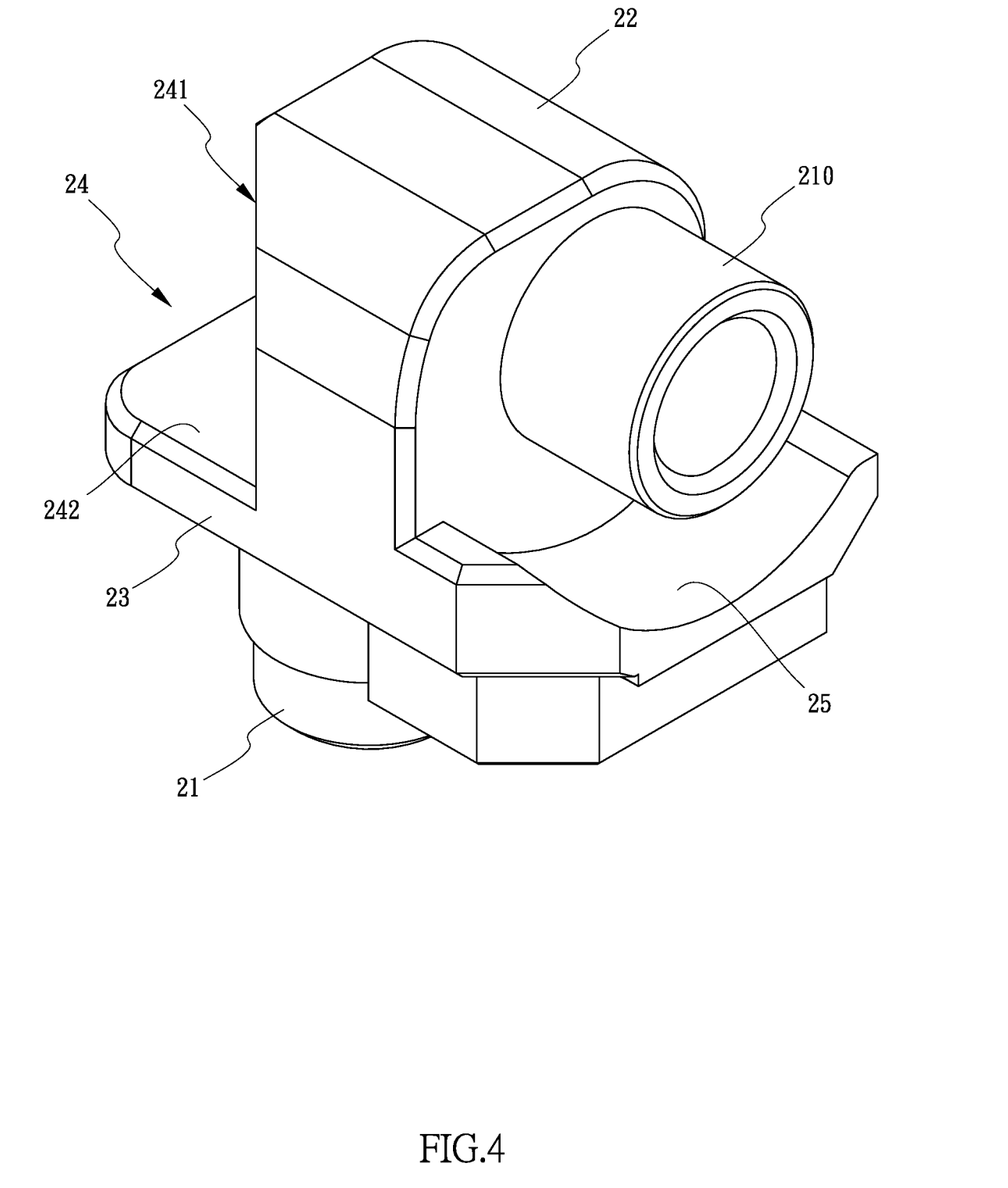
FIG. 4 shows the pivotal member of the motorcycle brake pedal lever of the present invention.
Figure 5:
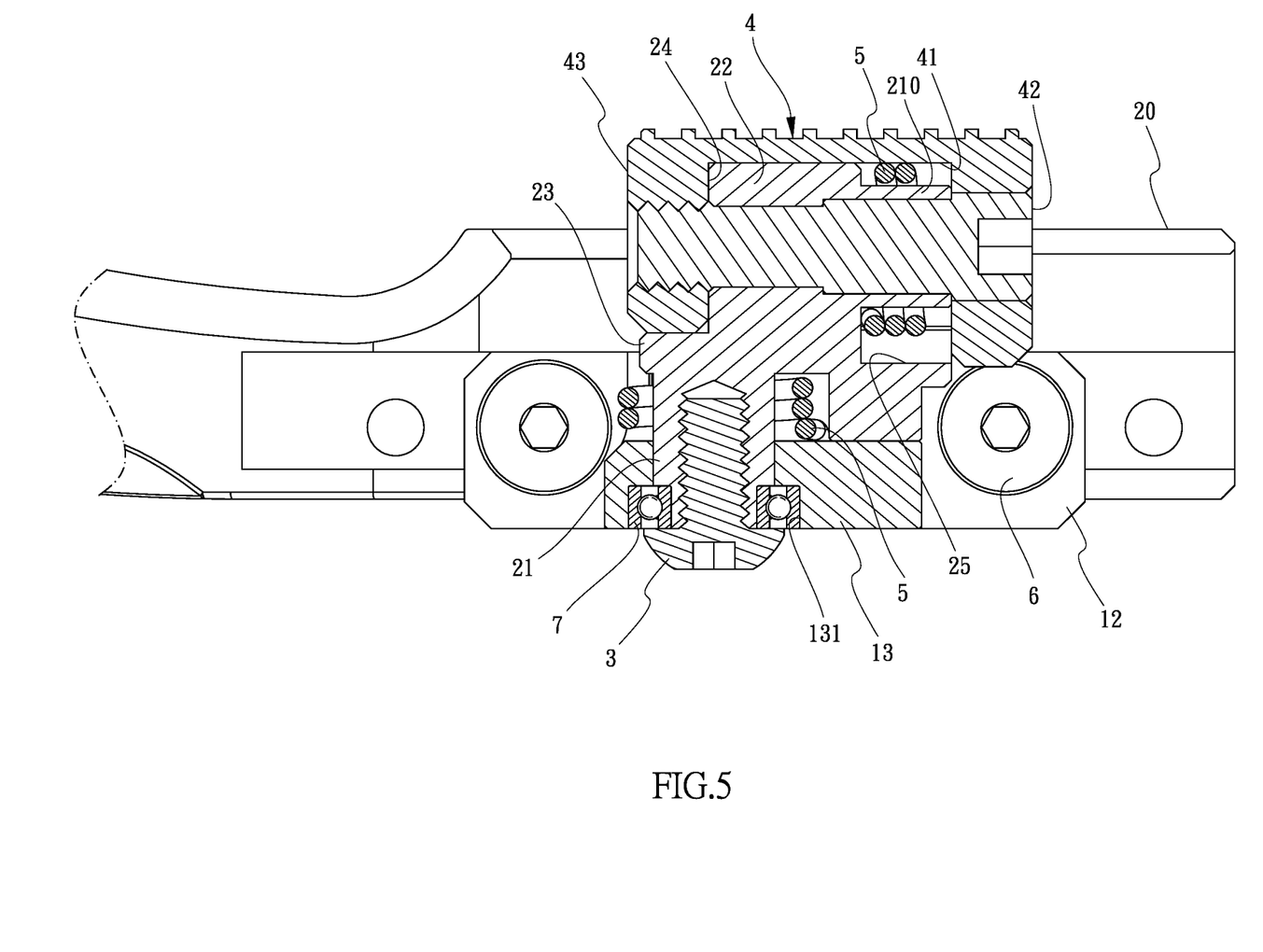
FIG. 5 is a cross sectional view, taken along line IV-IV in FIG. 2.
Figure 6:
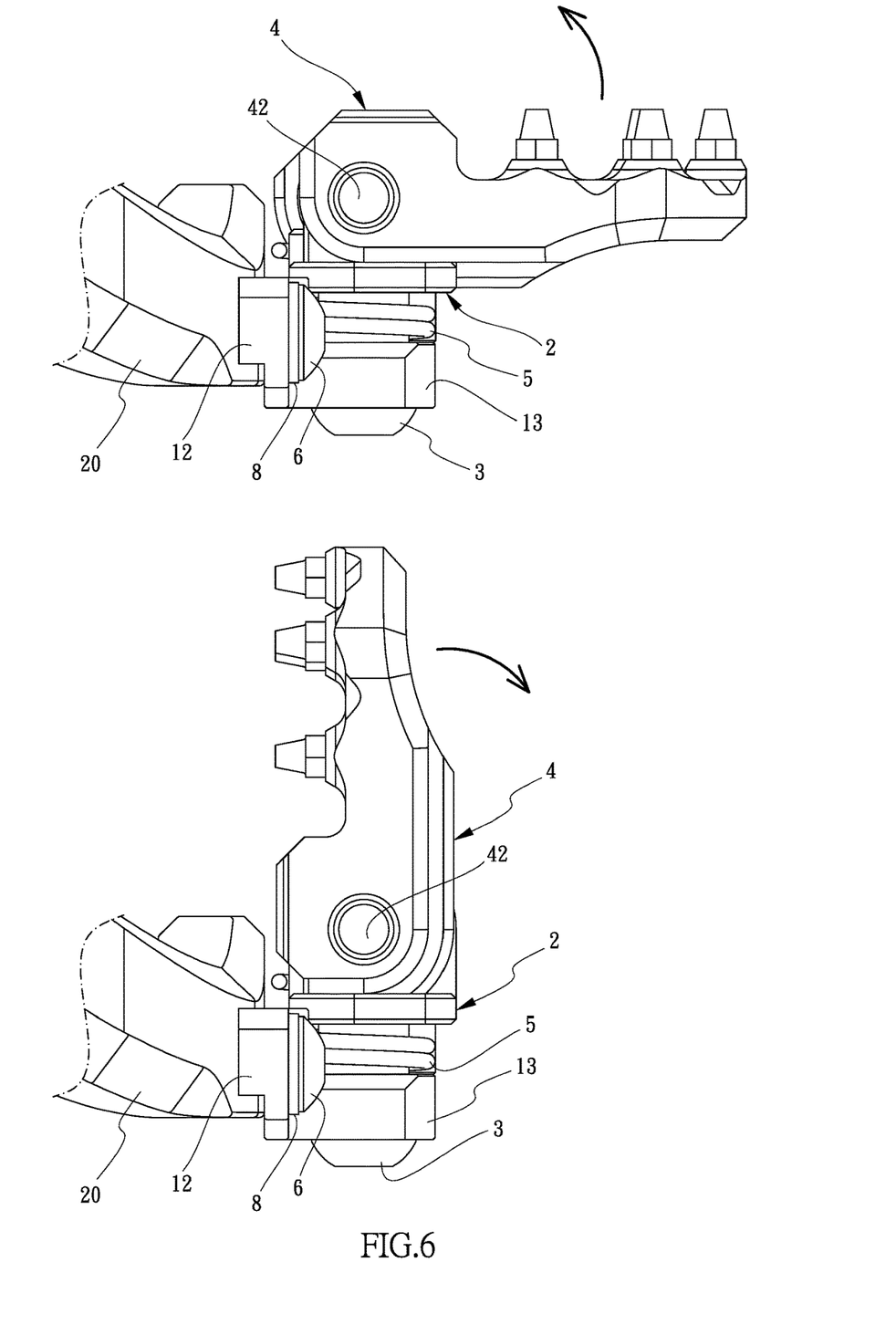
FIG. 6 illustrates that the peg is pivoted up and down relative to the base.

As shown in FIGS. 3 and 4, the pivotal member 2 includes a first part 22 and a second part 23 which is formed to the lower portion of the first part 22. A first cut-out 24 is formed between the first end of the first part 22 and the first end of the second part 23, and a second cut-out 25 is formed between the second end of the first part 22 and the second end of the second part 23. The second pivot 210 extends from the second end of the first part 22 and is located in the second cut-out 25. The first part 22 and the second pivot 210 are located in the space 41 of the peg 4. The first part 22 and the second pivot 210 respectively contact two inside walls of the space 41 of the peg 4. The first cut-out 24 includes a lateral face 241 and an inner bottom face 242. The space 41 is located between two end portions 43 of the peg 4. When the first part 22 of the pivotal member 2 is located in the space 41 of the peg 4, the lateral face 241 and the inner bottom face 242 of the first cut-out 24 respectively contact the end portion 43 in the first cut-out 24 as shown in FIG. 7. By this specific structure, the peg 4 is firmly assembled to the pivotal member 2, and the first part 22 is not shifted or drop from the space 41.

The second board 13 includes a circular recess 131 formed in the underside thereof, and the circular recess 131 communicates with the bore 11 and accommodates a bearing 7 therein. The first pivot 21 of the pivotal member 2 extends through the bearing 7, and the locking member 3 is directly connected to the first pivot 21 extending through the second board 13. By the bearing 7, the pivotal member 2 is smoothly pivoted relative to the base 1, and the peg 4 is smoothly pivoted in horizontal and vertical directions.

A washer 8 is mounted to each of the bolts 6 and contacts the first board 12 and is located corresponding to the locking hole 121 corresponding thereto so as to reduce friction between the bolts 6 and the first board 12. As shown in FIGS. 3 and 7, the torsion springs 5 have high torque coefficients to effectively drive the pivotal member 2 and the peg 4 to return.

While we have shown and described the embodiment in accordance with the present invention, it should be clear to those skilled in the art that further embodiments may be made without departing from the scope of the present invention.

What is claimed is:

1. A motorcycle brake pedal lever comprising:
   a rod adapted to be connected to a motorcycle;
   a base having a first side thereof connected to the rod, a second side of the base having a bore defined therethrough;
   a pivotal member having a first pivot and a second pivot, the first pivot pivotably connected to the bore, a locking member extending through the base from an underside of the base and connected to the first pivot, the pivotal member being pivotable about the first pivot;
   a peg having a space formed therein, the second pivot of the pivotal member pivotably engaged with the space, a pin extending through the peg, the space and the second pivot to pivotably connect the peg to the pivotal member, so that the peg is pivotable about the pin and the second pivot, and
   multiple torsion springs respectively mounted to the first and second pivots, one of two ends of each of the torsion springs contacting the pivotal member, another one of the two ends of each of the torsion springs contacting the base and the peg, the peg being returned relative to the pivotal member, and the pivotal member being returned relative to the base by respective recovery forces of the torsion springs.

2. The motorcycle brake pedal lever as claimed in claim 1, wherein the pivotal member includes a first part and a second part which is formed to the first part, a first cut-out is formed between a first end of the first part and a first end of the second part, a second cut-out is formed between a second end of the first part and a second end of the second part, the second pivot extends from the second end of the first part and is located in the second cut-out, the first part and the second pivot are located in the space of the peg, the first part and the second pivot respectively contacting two inside walls of the space of the peg.

3. The motorcycle brake pedal lever as claimed in claim 2, wherein the first cut-out includes a lateral face and an inner bottom face, the space is located between two end portions of the peg, one of the two end portions includes an underside and an inner end, the inner end faces the space, when the first part of the pivotal member is located in the space of the peg, the lateral face of the first cut-out contacts the inner end of the end portion, and the inner bottom face of the first cut-out contacts the underside of the end portion.

4. The motorcycle brake pedal lever as claimed in claim 1, wherein the base includes a first board and a second board which is perpendicularly formed to the first board, two locking holes are respectively defined through the first board, the second board is located between the two locking holes, the bore is defined through the second board, two bolts extend through the two locking holes and are connected to the rod.

5. The motorcycle brake pedal lever as claimed in claim 4, wherein a stop is formed between the first board and the second board, when the peg is pushed and pivoted toward the rod, the stop contacts the pivotal member to restrict the peg from touching the pivotal member.

6. The motorcycle brake pedal lever as claimed in claim 4, wherein the second board includes a circular recess formed in an underside thereof, the circular recess communicates with the bore and accommodates a bearing therein, the first pivot of the pivotal member extends through the bearing, the locking member is connected to the first pivot extending through the second board.

7. The motorcycle brake pedal lever as claimed in claim 4, wherein a washer is mounted to each of the bolts and contacts the first board and each washer is located at a respective one of the two locking holes, the bolts are connected to the rod.

* * * * *